Feb. 9, 1943.          T. W. ROLPH          2,310,810
                        LUMINAIRE
                   Filed Nov. 27, 1940
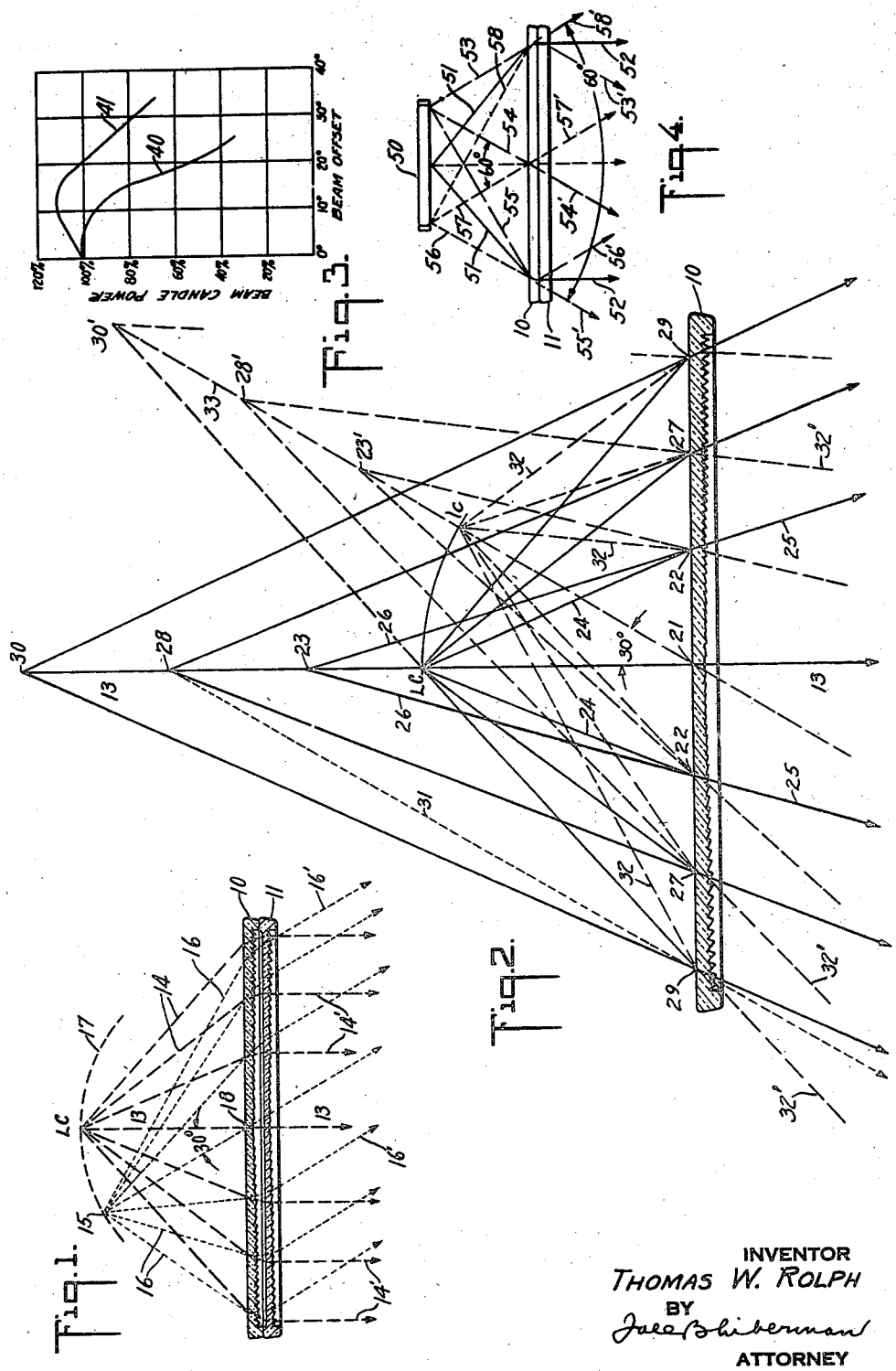
INVENTOR
THOMAS W. ROLPH
BY
Jule Shiberman
ATTORNEY Patented Feb. 9, 1943

2,310,810

UNITED STATES PATENT OFFICE 2,310,810

LUMINAIRE

Thomas W. Rolph, Newark, Ohio, assignor to Holophane Company, Inc., New York, N. Y., a corporation of Delaware Application November 27, 1940, Serial No. 367,334

7 Claims. (Cl. 240—106.1)

The present invention relates to luminaires, and is more particularly directed toward luminaires for projecting concentrated light beams in controlled directions for lighting displays and the like.

A common type of lens equipment adapted to concentrate light from a point source into a beam of parallel rays is the plano-convex Fresnel lens, where the principal deviation is obtained at the emergent surface. For efficient light utilization such lenses are inadvisable where widely divergent light is to be utilized. The use of two sets of opposed prisms designed to co-operate with one another make it possible to accept a wider spread of direct light and place the lens equipment closer to the source, and in these cases the typical design employs an inner set of prisms which partially concentrate the light so that it appears to come from a single virtual source more remote from the lens than the actual source. These partially converged rays fall on the outer set of prisms, which may be of Fresnel contour, and are emitted parallel, as though the real source were at the virtual focus of the upper lens system. Lens systems of the design just referred to are in common use for spot lighting and signals. Minor changes in direction of the beam may be had by offsetting the source (and spherical reflector, where used) with respect to the axis of the lens system, but with loss of beam candle-power, and if an attempt is made to offset the same more than 15°, the loss is excessive. It has therefore been customary to limit the beam throw with stationary lens systems, or where wider beam throw is necessary to provide apparatus wherein the entire optical system may be tipped.

The present invention contemplates an optical system wherein the lenses may be kept stationary and a much greater beam throw had with little loss in beam candle-power by shifting the source (and reflector) through much wider angles than possible with the conventional equipment.

The accompanying drawing shows, for purposes of illustrating the present invention, an embodiment in which the invention may take form, together with modifications of certain parts, it being understood that the drawing is illustrative of the invention rather than limiting the same.

In the drawing:

Figure 1 shows a cross section of a luminaire showing the fixed lens and the light center in two positions;

Figure 2 shows the lens action of the inner piece only with axially disposed source at the proper spacing from the lens;

Figure 3 shows the comparative candle-power performance of the lens of Figure 1 and that of a lens in common use and of the same size and focal length; and Figure 4 illustrates the lens action where the source has substantial dimension.

In Figure 1 the lenses shown comprise two pieces, an upper piece 10 and a lower piece 11. Each piece has a smooth side upward or toward the light source LC and concentrating prisms on the lower side. These prisms are ordinarily concentric, but may run in other directions. When the beam is to be directed straight downward, the light center LC is in the axis 13—13 of the lens as shown. Typical light rays are shown at 14—14'. When the light center is moved to the position 15, the beam is offset as indicated by the light rays 16—16'. The path through which the light center is shifted is an arc 17 whose center is at the center 18 of the upper surface of the lens. This path need not be followed exactly in offsetting but the best beam results are obtained by following it reasonably closely.

Figure 2 shows the upper part 10 of the lens with light center LC in position for directing the beam from the combination lens (10—11) downward. In this position the upper piece 10 of the lens naturally gives a partially concentrated distribution of light, because it is doing only a part of the work of the entire lens. However, the operation of this lens differs from the customary operation of a lens giving partial concentration. Ordinarily such a lens or lens piece would place the apparent light center on the axis of the lens at some point more remote than the true light center. The lens shown in Figure 2 moves the apparent light center back from the true light center along the axis in progressive steps as the distance from the center of the lens increases.

For example, at the center 21 of the lens the light is going straight through from light center LC. At the points 22—22 a short distance out on the lens from the center, the prism is such as to move the apparent light center from LC back to 23. The light rays from the true light center to the lens are indicated at 24—24 and the light rays after going through the lens are indicated at 25—25. 26—26 is the extension of this light ray back to the axis to indicate the apparent light center at 23.

At points 27—27 on the lens which are farther out from the center than points 22, the prism is such as to move the apparent light center back to point 28 on the axis, this being farther away from the true light center LC than point 23 is. Similarly at points 29—29 on the lens, still farther out, the action of the prism is such that the apparent light center is moved back to point 30 on the axis, still farther away from the true light center LC.

It will be apparent from Figure 2 that the upper piece of the complete two-piece lens has the peculiar characteristic of producing a retreating apparent light source with widening of angle of divergence. This characteristic of the upper piece, when combined with the action of the outer piece completing the concentration, permits far greater angular offsets than have been heretofore possible with good maintenance of beam candle-power.

It will also be apparent that the amount of work performed by this lens piece 10 increases from the center toward the edge of the lens, and not only that, it increases faster than would be the case if the lens were made to produce a single apparent light source. This means that the second part of the lens (piece 11) has less work to do at the outer edges than would be the case with customary lens design. Consequently, the ratio of work performed (or deviation of light produced) by the inner piece compared with the outer piece increases from the center of the lens outward.

This will be made clear by reference to the action of lens 10 as shown in Figure 2. If at point 29 the apparent light source were the same as at point 27, namely at point 28 on the axis, the amount of light bending produced at point 29 would be less than it is. If the apparent light center were at 28, the dotted line 31 would represent the light ray leaving the lens and extended back to the apparent light center. Then the angle of bending accomplished by the lens would be angle LC—29—28. The angle of bending actually accomplished at point 29 is the angle LC—29—30, since 30 is the apparent light center produced by the prisms at point 29. This angle LC—29—30 is obviously larger than LC—29—28, thus showing the increased action of the lens at this point over what would be obtained if the apparent light center remained the same for point 29 as for point 27.

Again referring to Figure 2, it will be assumed that the source is offset 30° as shown at lc. The direct rays to the points 21, 22, 27 and 29 are indicated by the short dash lines 32, corresponding with the rays 16 of Figure 1. The central ray will pass without deviation and the other rays 32 will be converged toward the undeviated ray lc 21. The rays will be refracted variable amounts and emitted generally as indicated at 32'. There will be a new locus 33 of virtual foci 23', 28' and 30' extending back of the source lc and diverging from the true lens axis. From this it is apparent that the more remote parts of the inner lens have greater lens action than if the apparent light source were not progressively shifted. Hence in all cases there is less work for the opposed prisms of the outer piece to do to render the rays parallel to the beam axis, than would be the case with the ordinary constructions.

Figure 3 shows the results obtained. The beam candle-power is indicated in percent of the candle-power obtained when the light source is in the proper focus in the axis. The curves 40 and 41 show this beam candle-power for different angles of lamp offset from the axis. The lower curve 40 shows the results obtained with a lens of the same size and same focal length as this new type lens of Figure 1 whose performance is shown in the upper curve 41. With the previous lens, the candle-power is maintained reasonably well for offsets out to about 15°. At that point the candle-power is dropping rapidly as the offset increases. At 20° it is down to only 55% of the beam candle-power obtained in the axial position. At higher angles of offset than 15° to 20°, the lens becomes practically worthless for spotlighting. The new type lens shows different characteristics. The candle-power increases somewhat at the smaller offsets and then decreases at larger offsets. At 20° offset, the beam candle-power is practically the same as when the lamp is in the axis. At 30° offset, the beam candle-power has dropped only 21%, to 79% of the candlepower obtained in the axial position of light source. Thus, it will be clear that the new characteristics introduced into this lens construction are producing the beam results desired at high angles of offset. This makes it possible to mount the lens horizontally in a lighting fixture and at the same time set the lamp in such a position as to direct the beam at large angles out from the vertical.

With any lens, the spread of the beam and consequently, the size of the illuminated spot obtained, tends to increase with decrease in beam candle-power. Consequently, with the older types of lenses, the size of the spot increases as the offset of the beam increases. With this new lens the candle-power is maintained at or close to maximum throughout a considerable range and so the size of the illuminated spot also remains substantially the same even at considerable angles of beam offset.

In lighting displays of all kinds as in show windows and in stores, in directing the beam at particular directions for surgical operations and for many other purposes, this spotlighting lens, capable of giving a beam which is highly offset, is particularly useful.

While the prisms shown in the cross section of the lens of Figure 1 would ordinarily be concentric prisms and the lens round or square, it is possible to apply this construction to rectilinear light sources in which case the prisms would ordinarily be straight lines running parallel to the direction of the light source. Figure 1 can be considered as a cross section of such a construction in which the rectilinear source would be perpendicular to the plane of the paper at the point LC. In that case the path 17 of the light source would be cylindrical whereas in the concentric prism construction, it is spherical. In either case, it would be indicated by an arc.

Figure 4 illustrates the use of lens equipment of the type shown in Figure 1 with a source of radiant energy 50 which may be transverse of rectilinear or annular prisms, or annular or disklike with annular prisms. The rays 51, 51 coming from the center of the source at substantially the point LC of the other figures will be emitted parallel, as indicated at 52. Rays, such as 53, 54 and 55 indicated in long dash lines, will be emitted with the slope of 30° to the left, as indicated by the rays 53', 54' and 55'. Rays 56, 57, 58 coming from the left end of the source will be emitted at angles of 30° to the right of the center, as indicated at 56', 57', 58'. The overall spread of the beam projected from the source 50, which may have a length half the width of the lens plates, is therefore 60°. The lens system therefore is suitable for use with sources of radiant energy of such dimension as to be too large for satisfactory control by the ordinary type of lens equipment. It makes it possible to have an overall spread of rays as indicated by the lower arc of 60° of Figure 4 which equals the angle of convergence, 60°, of rays from the boundaries of the region occupied by the source.

While the lenses are shown flat, it should be understood that this is not a limitation of this construction. The lens may be curved in various ways depending upon the design requirements of varied applications.

It is obvious that the invention may be embodied in other forms and constructions within the scope of the claims and I wish it to be understood that the particular form shown is illustrative. Various modifications and changes being possible, I do not otherwise limit myself in any way with respect thereto.

What is claimed is:

1. A doublet lens for producing on opposite sides of its axis a beam of substantially parallel rays from a point source when the source is in the focus in the axis of the lens or when the source is offset from the focus as much as 30° from the lens axis without change in its distance from the center of the lens, the lens comprising two pieces through which rays travel in succession, each piece being smooth on the side toward the source and carrying condensing prisms on the side away from the source, the refracting power of the prisms of the first piece being a function of the distance from the center such that the corresponding virtual light sources recede with increase of said distance, the refracting power of the opposed areas of the outer piece being a function of their distance from the lens center such that rays from the corresponding virtual sources are refracted into substantial parallelism with the undeviated ray passing through the center of the doublet lens.

2. A lens for producing a beam of substantially parallel rays from a point source at the lens focus comprising two pieces through which the rays travel successively, the piece nearer the source having annular prisms which partially concentrate the incident rays from said source, the outer piece having annular prisms to complete the bending of the rays into substantial parallelism, the refracting power of the prisms of the first piece being a function of the distance from the center such that the corresponding virtual light sources recede with increase of said distance, the refracting power of the opposed areas of the outer piece being a function of their distance from the lens center such that rays from the corresponding virtual sources are refracted into substantial parallelism with the undeviated ray passing through the center of the lens.

3. A lens for producing a beam of substantially parallel rays from a point source at the lens focus comprising two pieces in which the inner piece has annular prisms which partially concentrate the incident rays from said source and the outer piece has annular prisms which bend the rays into substantial parallelism, the refracting power of the prisms of the first piece being a function of the distance from the center such that the corresponding virtual light sources recede with increase of said distance, the refracting power of the opposed areas of the outer piece being a function of their distance from the lens center such that rays from the corresponding virtual sources are refracted into substantial parallelism with the undeviated ray passing through the center of the lens.

4. In combination, a source of radiant energy, and a doublet lens having an inner piece provided with a system of prisms symmetrical on opposite sides of an axis and whose refracting power at any point is a function of the distance of said point from the said axis such that the corresponding virtual sources recede with increase in said distance, and an outer piece having a system of prisms whose focal lengths correspond with the virtual sources of the opposite points of the inner piece, whereby rays originating at any point in an extended region about said axis at a predetermined distance from said lens, are emitted from the outer piece parallel with one another and whereby the overall spread of emitted rays is confined to an angle substantially equal to the angle of convergence of rays from the boundaries of the region onto the center of the lens system.

5. A luminaire having a source of light rays which extends through a region a substantial distance each side of an axis, and a doublet lens having an inner piece provided with a system of prisms symmetrical on opposite sides of said axis and whose refracting power at any point is a function of the distance of said point from the said axis such that the corresponding virtual light sources recede with increase in said distance, and an outer piece having a system of prisms whose focal lengths correspond with the virtual light sources of the opposite points of the inner piece, whereby rays originating at any point in said region are emitted from the outer piece parallel with one another.

6. A luminaire which includes a substantially point source of light and a doublet lens, wherein the light source may be moved at will throughout a region a substantial distance each side of a line which forms the axis of the lens, the lens having an inner piece provided with a system of prisms symmetrical on opposite sides of said axis and whose refracting power at any point is a function of the distance of said point from the said axis such that the corresponding virtual light sources recede with increase in said distance, and an outer piece having a system of prisms whose focal lengths correspond with the virtual light sources of the opposite points of the inner piece, whereby rays originating at any point in said region are emitted from the outer piece parallel with one another.

7. A luminaire having a normally horizontal source of light rays of substantial length each side of a central point, and a doublet lens having an inner piece provided with a system of prisms symmetrical on opposite sides of a normally vertical axis passing through said central point and whose refracting power at any point thereon is a function of the distance of said point from the said axis such that the corresponding virtual light sources recede with increase in said distance, and an outer piece having a system of prisms whose focal lengths correspond with the virtual light sources of the opposite points of the inner piece, whereby rays originating at any point along said source are emitted from the outer piece parallel with one another.

THOMAS W. ROLPH.